United States Patent [19]
Krol

[11] 3,945,293
[45] Mar. 23, 1976

[54] HEAVY DUTY FASTENER AND METHOD OF MANUFACTURING SAME

[75] Inventor: Harry J. Krol, Arlington Heights, Ill.

[73] Assignee: King-Koral, Inc., Glenview, Ill.

[22] Filed: Feb. 4, 1974

[21] Appl. No.: 439,571

[52] U.S. Cl. .................................. 85/49; 85/21
[51] Int. Cl.² ................................... F16B 15/06
[58] Field of Search .............................. 85/21, 49

[56] References Cited
UNITED STATES PATENTS

| | | | |
|---|---|---|---|
| 2,182 | 7/1841 | Ballard | 85/21 |
| 106,010 | 8/1870 | Wickersham | 85/21 |
| 1,264,683 | 4/1918 | Ricci | 85/21 |
| 1,808,197 | 6/1931 | Woodruff | 85/21 |
| 2,202,896 | 6/1940 | Buchner et al. | 85/21 |
| 2,613,570 | 10/1952 | Sokolik | 85/21 |
| 2,759,389 | 8/1956 | Corckran | 85/21 |
| 2,867,807 | 1/1959 | Anstett | 85/49 |

FOREIGN PATENTS OR APPLICATIONS

| | | | |
|---|---|---|---|
| 1,562,230 | 2/1969 | France | 85/21 |
| 1,222,981 | 2/1971 | United Kingdom | 85/49 |

*Primary Examiner*—Marion Parsons, Jr.
*Attorney, Agent, or Firm*—Hill, Gross, Simpson, Van Santen, Steadman, Chiara & Simpson

[57] ABSTRACT

A heavy duty fastener is provided especially suitable for outdoor uses such as in heavy timber including utility poles. For example, it may be in the form of a staple for securing a telephone ground wire cover to a pole. It has along each leg or prong a series of longitudinally spaced interlock notches for engagement therein of the severed bent-in edges of growth rings of the timber member in which the fastener is secured, the notches having shoulders facing generally toward and interlocked with the severed edges which thoroughly resist withdrawal of the fastener from the wood member.

Tearing of the fiber structure of the wood during driving in of the fastener is minimized by having all laterally projecting surfaces along the prongs smoothly rounded, including shoulder lips and lateral side shoulder projections generally aligned with the notches.

Manufacture of the fastener by coining of the interlock notches is facilitated. The interlock notches are formed in preferably square rod or wire stock between complementary dies contoured to indent the notches in opposite sides of the fastener prongs, shape arched sloping walls and shoulders in the notches, displace material from the notches to provide the shoulder lips and shoulder projections, and coin harden the material along the prongs.

1 Claim, 7 Drawing Figures

HEAVY DUTY FASTENER AND METHOD OF MANUFACTURING SAME

This invention relates to heavy duty fasteners and method of manufacturing same, and is more particularly concerned with staples such as may be especially useful in the electrical utilities industries, for example to secure ground wire covers and other members to utility poles.

Fasteners as heretofore provided have had various and sundry disadvantages, deficiencies, shortcomings and have presented various problems both structurally and economically. Some staples have barbs of such roughness as to unduly tear the wood during driving so that the wood cannot properly recover and grip the fastener whereby poor holding power results, and weathering can creep into the wood along the staple prongs to accelerate deterioration. Where the fastener prongs or legs are inadequately anchored, they will not resist pulling out sufficiently to withstand abuse such as severe weathering conditions, brushing thereagainst of objects such as lawn mowers, linemen's boots, animals rubbing thereagainst, vibrations, bending stresses, etc. Round wire types of staples have had as one shorcoming the single point contact on the head for driving hammer impact so that there is undue concentration at such point and thus the liability of flattening until enough flat results to secure full power of blows to drive the staple into denser types or denser areas of wood. This may result in undesirable bending distortions of the head.

Prior structures have often been difficult to make, or at least require slow manufacturing techniques, such, for example as round wire staples with rolled barbs in the production of which the wire must first but cut to length, then points formed on the legs, after which roll forming of the barbs is effected by rolling entirely around the perimeter of the wire, and the piece then finally formed into a staple. Production thus depends on how fast the roll forming tools can advance and return to the original position to pick up the next blank.

It is therefore an important object of the present invention to overcome the foregoing and other disadvantages, deficiencies, inefficiencies, shortcomings and problems in respect to fasteners of the type indicated and to attain important improvements and advantages and new and improved results in the structure of and in a method of making, such fasteners.

Another object of the invention is to provide a new and improved heavy duty staple especially useful for securing members to heavy timbers such as utility poles.

A further object of the invention is to provide a new and improved heavy duty staple which is relatively easy to drive into wood and which maintains an unusually secure anchorage in the wood.

Still another object of the invention is to provide a new and improved anchoring shoulder structure on fastener prongs affording improved strength and resistance to undesirable bending or deflection during driving and with improved holding coaction in the wood into which driven.

A yet further object of the invention is to provide a new and improved fastener having novel retaining structure along its driving prong or prongs offering minimum resistance to driving into wood but providing strong resistance to withdrawal from the wood.

It is also an object of the invention to provide a new and improved method of making heavy duty fasteners for driving into wood.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which.

Figure 1:
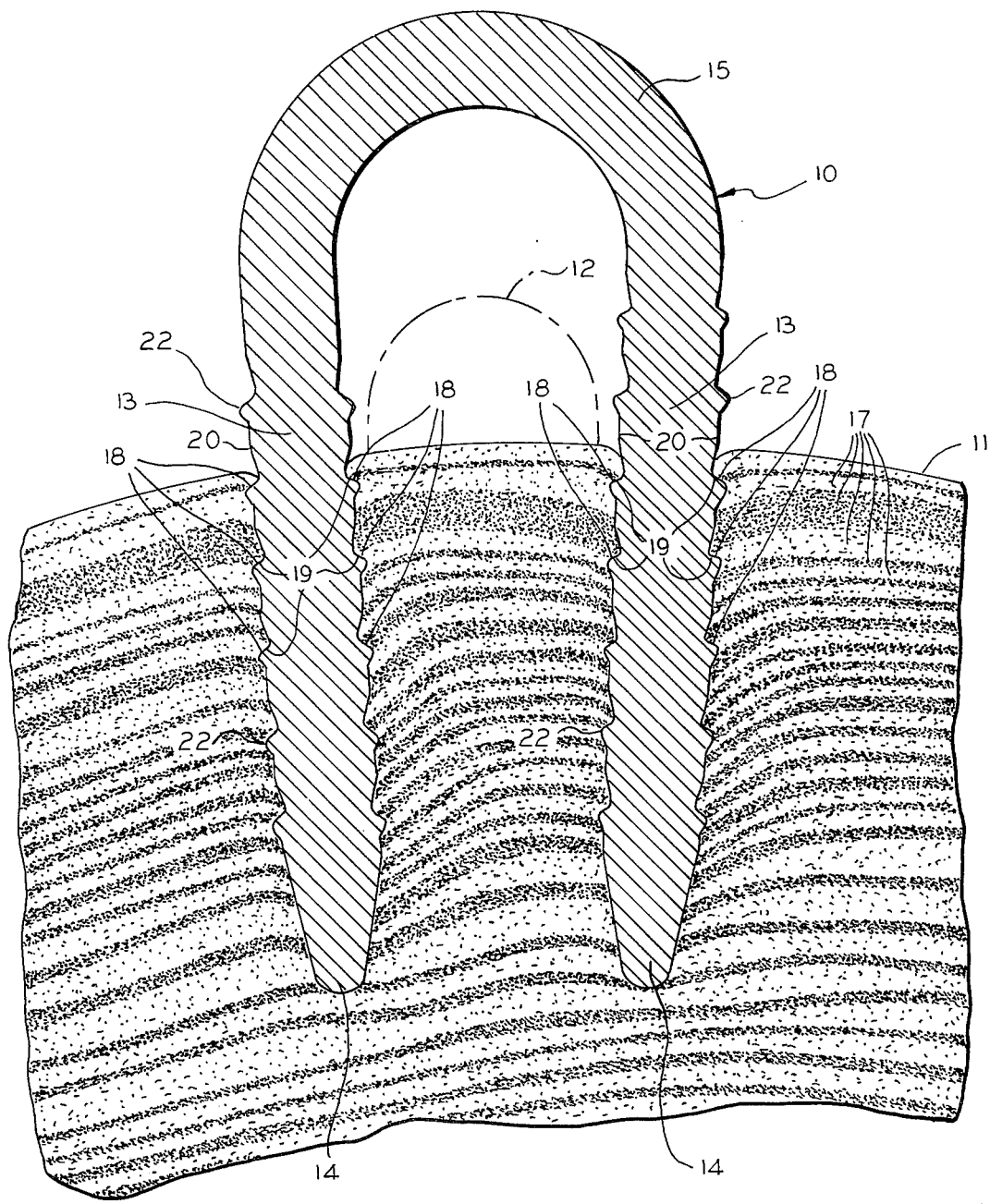
FIG. 1 is an enlarged sectional detail view showing a fastener in staple form according to the present invention partially driven into a wood member such as a utility pole.

As depicted in FIG. 1, a heavy duty fastener 10 embodying feature of the present invention is especially constructed and adapted to be driven into anchored relation in a timber member such as a utility pole 11, for example, to secure a ground wire cover 12. The fastener 10 is provided with at least one leg or prong 13 having a sharp penetrating tip 14 which may be of generally spade edge shape as shown. In this instance the fastener 10 is of the U-shape staple form having a pair of the prongs 13 in coextensive relation and connected together by an integral arcuately shaped head 15. In practice, the staple 10 is placed with the prongs 13 in straddling relation to the member to be fastened such as the ground wire cover 12 and the staple is then driven home by means of a tool such as a hammer applied against the crown of the head 15. As the prongs 13 penetrate into the wood of the pole 11 they cut across and penetrate through growth rings 17 in the wood.

By reason of the cross sectional mass of the respective prongs 13, they must compress and displace a corresponding mass of the wood fibers. The denser growth rings 17 resist compression and as shown bend at their severed edges along the prongs 13 in the direction in which the prongs were driven into the wood member. This characteristic is taken advantage of by the present invention by providing the prongs 13 on at least one side and preferably both sides thereof with anchoring notches 18 spaced apart sufficiently to receive in each of the notches a bent edge of one or more of the growth rings 17 and more particularly the dense annual rings. To facilitate thorough anchoring engagement of the turned, bent growth ring edges with the prongs 13 in the notches 18, each of the notches is defined by a shoulder 19 facing generally toward the head end of the respective prong and a surface 20 slanting in from the side of the prong to a juncture with the shoulder. In a desirable construction, the shoulders 18 may be spaced apart about ⅛ inch and the width of the shoulders may be about 1/32 of an inch. By way of example, the fastener 10 so equipped may be made from square wire or rod stock of suitable dimensions such as on the order of from ⅛ inch to 7/32 inch cross section, with the leg prongs 13 on the order of 1½ to 4 inches long, and the space between the prongs 13 on the order of from ¼ to 1 3/16 inches.

Anchoring retention of the prongs 13 by the bent edges of the growth rings 17 interlocking with the shoulders 19 is improved by a sloping shoulder angle of about 15° relative to a plane normal to the longitudinal axis of the associated prong 13, and with the slope directed away from the head end of the prong and generally in the direction of the penetrating tip end of the prong. This has been found to just about match the inclination of the bent growth ring edges toward the shoulder 19, thereby effecting maximum shouldering efficiency and interlocking of the growth ring edges with the shoulder 19 and maximizing the shear forces required to remove the fastener. An included angle of about 90° between the shoulders 19 and the slanting surfaces 20 has been found desirable to hold the growth ring edges bent toward the shoulders 19.

Figure 5:
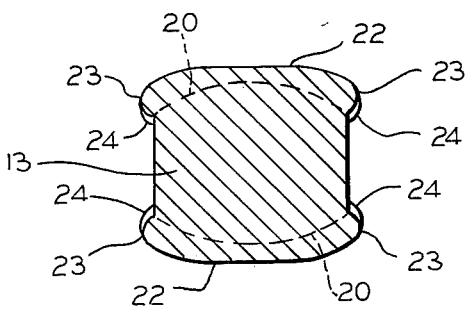
FIG. 5 is a fragmentary sectional detail view taken substantially along the line V—V of FIG. 3.

In the fastener 10 exemplifying the invention, the penetrating tips 14 are formed by cutting the tip end portions of the prongs 13 along diagonally inclined faces 21 (FIGS. 2 and 5) to the tips 14. A face angle of about 15° relative to the prong axis is satisfactory. Although shown oppositely angled across the notched prong sides, the faces 21 may be otherwise disposed such as between the notched sides and slanting in the same direction. Each of the prongs 13 may have the series of notches 18 terminate short of the faces 21 or formed continuous to the tips 14.

Figure 6:
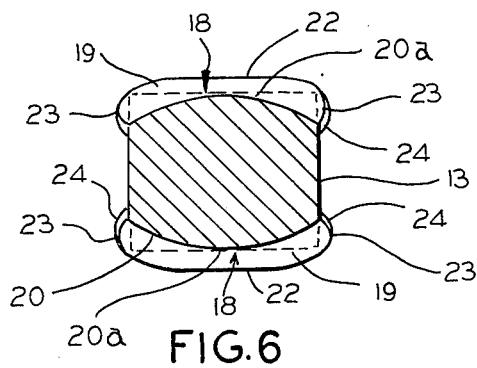
FIG. 6 is a fragmentary sectional detail view taken substantially along the line VI—VI of FIG. 3.

For manufacturing efficiency the interlock notches 18 are located in alignment along generally normal planes relative to the shank axis of the respective prongs. Weakening of the prongs 13 in the areas therealong provided with the interlock notches 18 is substantially minimized by having the slanting surfaces 20 transversely arched outwardly at 20a intermediate the opposite sides of the notches 18, as best visualized in FIG. 6. Nevertheless, the shoulders 19 are not diminished in anchoring effectiveness because they are of maximum shoulder surface, that is of greatest depth, at the opposite sides of the notches 18 where they are of upmost effectiveness, taking advantage of not only pressure of the wood into which driven expanding toward the sides of the prongs 13 in which the notches 18 are formed, but also gaining advantage of the wood expanding and crowding in from the sides of the prong 13 at which the sides of the notches 18 run out.

Contributing to the holding efficiency of the fastener 10 are projections of the shoulders 19 beyond the original planes of the four sides of the respective leg prongs 13. Lip projections 22 (FIGS. 2, 3, 5 and 6) are provided along the outer edges of the shoulders 19 to increase the effective shoulder depth, and shoulder extensions 23 are provided at the opposite sides of the shoulders 19 increasing their width, even though the actual depth to which the notches 18 are formed is limited.

Figure 2:
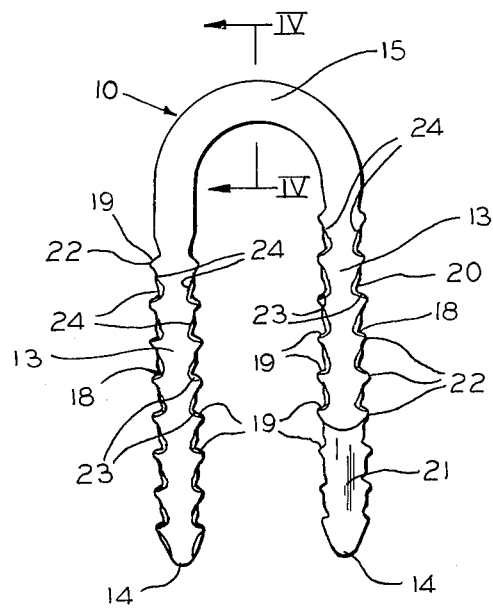
FIG. 2 is a face elevational view of the fastener.
Figure 3:
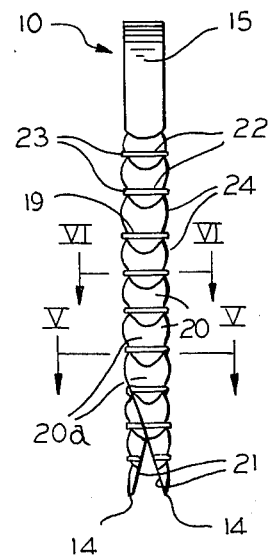
FIG. 3 is a side elevational view of the fastener.

Holding efficiency of the prongs 13 is further improved by providing lateral shoulder projections 24 at the opposite sides of the slanting surfaces 20. As best seen in FIG. 2, by reason of the slanting relationship of the projections 24, they provide shouldering surfaces facing generally toward the head 15 of the fastener. Thereby the wood fibers of a penetrated member, and more particularly the growth ring edges crowding against those faces of the fastener prongs 13 from the planes of which the projections 24 extend, effect a desirable interlocking relationship with the projections 24 supplemental to the interlocking relationship of the edges with the shoulders 19. Interlocking efficiency of the shoulder projections 24 is enhanced by their generally convergent relation on both of the sides of the prongs 13 between the sides which have the notches 18 therein.

Figure 4:
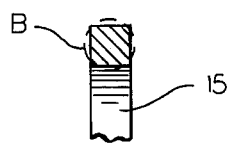
FIG. 4 is a fragmentary sectional detail view taken substantially along the line IV—IV of FIG. 2.
Figure 7:
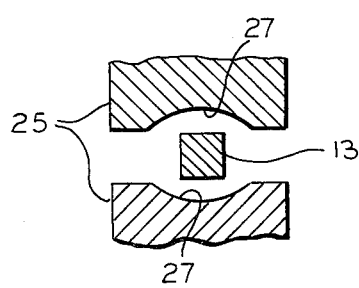
FIG. 7 is an illustrative view demonstrating coining of the interlock indentations in square sectioned stock in making the fasteners.

In manufacturing the fastener 10, preformed four-sided wire or rod may be used, but the stock from which the fastener is made may comprise an inexpensive grade of round wire, as schematically indicated at B in FIG. 4, which is suitably shaped as by rolling to provide the desired four-sided configuration, thereby hardening the material. Such hardening will not, however, interfere with bending the material into the U-form staple shape and which will finally harden the area of the head 15. Further hardening of the prongs 13 is effected by coining the interlock notches 18 therein. Coining may be effected along longitudinally spaced areas of the four-sided wire blank while the wire is straight and before the blanks are cut apart along the prong faces 21 and bent into the U-form of the staple. Suitable complementary simultaneously oppositely acting, opposed coining dies 25 (FIG. 7) are used having forming or working surfaces 27 shaped complementary to the shoulders 19 and the notch surfaces 20 to be formed thereby. More particularly, the forming die surfaces 27 are arched concavely to strike the convexly arched configuration 20a for each of the surfaces 20. This transversely arched relationship between the die surfaces 27 and the notch surfaces 20, 20a lowers the necessary coining tonnage required because of easier coining displacement of material from the notches 18, results in smoother formation of the displaced material projections 21, 23 and 24 and permits increase in production speed.

In the coining operation, material displaced from the notches 18 becomes the projecting lips 22, the laterally extending shoulder projections 23 and the slanting shouldering projections 24. Of considerable practical value is that the projections 22, 23 and 24 are formed with rounded contours resulting from free coining displacement of the material without development of sharp edges. Thereby, tearing destruction of wood fibers in driving the fastener is substantially avoided, but penetration of the prongs 13 occurs cleanly. This preserves maximum value of the inherent recovery capability of the wood fiber structure after penetration of the fastener prongs for exceptionally thorough gripping retention of the fastener against pulling or working out of the wood.

The use of square wire in forming the fastener 10 offers the considerable advantage that the notches 18 can be formed deep at the four corners of the square wire stock for maximum holding efficiency with substantial economy that cannot be matched by shaping prongs on round wire.

By having a straight across crown on the head 15, a driving tool, i.e. hammer, can make contact over the full width of the head. This resists flattening and permits driving the fastener with less force and minimum time.

It will be understood that variations and modifications may be effected without departing from the spirit and scope of the novel concepts of this invention.

I claim as my invention:

1. A coined fastener having an elongated prong with a head at one end and a penetrating tip at its opposite end, and especially suitable for driving into wood across and into interlocking relation with the growth rings therein, comprising:
- a series of longitudinally spaced coined interlock notches in at least one side of said prong, the prong being essentially of a uniform square-shaped cross-section;
- each of said notches being defined by a shoulder facing generally toward but sloping away from the head end of the prong and a surface slanting in from said side to a juncture with said shoulder;
- each of said surfaces being transversely arched outwardly intermediate the opposite sides of the notches whereby weakening of the prong is minimized; and said shoulders being deepest at said opposite sides of said notches, including lateral projections aligned with the notches and derived from material displaced from said notches, wherein said projections are located at each side of said shoulders, and at each side of said surfaces, and provide projecting lips along the edges of said shoulders, wherein the included angle between said shoulders and said surfaces is about 90°, each notch being further defined as extending completely across the side of the fastener with the outer edge of the shoulder being generally convexly rounded at opposite ends thereof.

* * * * *